(12) United States Patent
Mehrasa et al.

(10) Patent No.: US 12,511,529 B2
(45) Date of Patent: Dec. 30, 2025

(54) SYSTEM AND METHOD FOR GENERATIVE MODEL FOR STOCHASTIC POINT PROCESSES

(71) Applicant: ROYAL BANK OF CANADA, Toronto (CA)

(72) Inventors: Nazanin Mehrasa, Vancouver (CA); Akash Abdu Jyothi, Vancouver (CA); Thibaut Durand, Vancouver (CA); Jiawei He, Vancouver (CA); Gregory Mori, Vancouver (CA); Mohamed Ahmed, Toronto (CA); Marcus Brubaker, Toronto (CA)

(73) Assignee: ROYAL BANK OF CANADA, Montréal (CA)

( * ) Notice: Subject to any disclaimer, the term of this patent is extended or adjusted under 35 U.S.C. 154(b) by 997 days.

(21) Appl. No.: 16/685,327

(22) Filed: Nov. 15, 2019

(65) Prior Publication Data

US 2020/0160176 A1    May 21, 2020

Related U.S. Application Data

(60) Provisional application No. 62/851,385, filed on May 22, 2019, provisional application No. 62/768,697, filed on Nov. 16, 2018.

(51) Int. Cl.
*G06N 3/08* (2023.01)
*G06N 3/044* (2023.01)
*G06N 3/045* (2023.01)

(52) U.S. Cl.
CPC ............... *G06N 3/08* (2013.01); *G06N 3/044* (2023.01); *G06N 3/045* (2023.01)

(58) Field of Classification Search
CPC ...... G06N 3/08; G06N 3/0445; G06N 3/0454; G06N 3/0481; G06N 3/0472; G06N 3/044; G06N 3/045; G06N 3/048; G06N 3/047
See application file for complete search history.

(56) References Cited

U.S. PATENT DOCUMENTS 10,373,055 B1 * 8/2019 Matthey-de-l'Endroit .................. G06N 3/0454
11,069,069 B2 * 7/2021 Rahimi ...................... G06T 7/20
(Continued)

OTHER PUBLICATIONS

Gregor, K. et al., "Temporal Difference Variational Auto-Encoder" (Year: 2018).*
(Continued)

*Primary Examiner* — Alexey Shmatov
*Assistant Examiner* — Devika S Maharaj
(74) *Attorney, Agent, or Firm* — NORTON ROSE FULBRIGHT CANADA LLP

(57) ABSTRACT

A variational auto-encoder model is trained to generate probabilities of action categories and probabilities of inter-arrival times of next action from a sequence of past actions by generating a concatenated representation of each action and associated time, encoding the concatenated representations, determining a conditional prior distribution for a next action, determining a conditional posterior distribution for the current action, sampling a latent variable from the conditional prior distribution, generating a probability distribution over a current action category, and generating a probability distribution over inter-arrival times for the current action category.

21 Claims, 9 Drawing Sheets

(56) References Cited

U.S. PATENT DOCUMENTS

| | | | |
|---|---|---|---|
| 11,243,532 B1* | 2/2022 | Levihn | B60W 60/0011 |
| 11,537,134 B1* | 12/2022 | Wiest | G05D 1/0221 |
| 2018/0218261 A1* | 8/2018 | Myara | G06N 3/045 |
| 2019/0041842 A1* | 2/2019 | Cella | G06N 20/00 |
| 2019/0378050 A1* | 12/2019 | Edkin | G06N 20/20 |
| 2021/0034969 A1* | 2/2021 | Wayne | A61P 35/00 |
| 2021/0191506 A1* | 6/2021 | Wang | G06F 40/30 |

OTHER PUBLICATIONS

Lee, A. et al., "Stochastic Adversarial Video Prediction" (Year: 2018).*

Butepage, J. et al., "Anticipating many futures: Online human motion prediction and synthesis for human-robot collaboration" (Year: 2017).*

Guo, Y. et al., "Multidimensional Time Series Anomaly Detection: A GRU-based Gaussian Mixture Variational Autoencoder Approach" (Year: 2018).*

Aliakbarian, M. et al., "Encouraging LSTMs to Anticipate Actions Very Early" (Year: 2017).*

Chaveroche, M. et al., "A Variational Time Series Feature Extractor for Action Prediction" (Year: 2018).*

Mishra, N. et al., "Prediction and Control with Temporal Segment Models" (Year: 2017).*

Chaveroche, M. et al., "A Variational Time Series Feature Extractor for Action Prediction", https://arxiv.org/abs/1807.02350, Sep. 2018 (Year: 2018).*

Mishra, N. et al., "Prediction and Control with Temporal Segment Models", https://arxiv.org/abs/1703.04070 (Year: 2017).*

Kim, T. et al., "Characterizing Dynamic Walking Patterns and Detecting Falls with Wearable Sensors using Gaussian Process Methods", https://www.mdpi.com/1424-8220/17/5/1172 (Year: 2017).*

* cited by examiner

| model | time loss | stoch. var. | accuracy | MAE time |
|---|---|---|---|---|
| Breakfast dataset | | | | |
| Time Deterministic LSTM | MSE | - | 53.64 | 173.76 |
| LSTM | tau loss | - | 61.39 | 152.17 |
| VAE 2 lstm - mode | tau loss | ✓ | 62.08 | 142.41 |
| MultiTUHMOS dataset | | | | |
| Time Deterministic LSTM | MSE | | | |
| LSTM | tau loss | - | 36.31 | 1.99 |
| VAE 2 lstm - mode | tau loss | ✓ | 39.32 | 1.89 |

Table 1

FIG. 8

| model | accuracy | MAE time |
|---|---|---|
| Breakfast dataset | | |
| VAE 2 lstm - avg | 58.97 | 146.17 |
| VAE 2 lstm - mode | 62.08 | 142.41 |
| MultiTUHMOS dataset | | |
| VAE 2 lstm - avg | 35.22 | 1.96 |
| VAE 2 lstm - mode | 39.32 | 1.89 |

Table 2: Model comparison on Breakfast and MultiTHUMOS datasets.

| model | #samples | accuracy | MAE time |
|---|---|---|---|
| MultiTUHMOS dataset | | | |
| VAE 2 lstm - mode | 100 | 39.19 | 1.894 |
| VAE 2 lstm - mode | 200 | 39.27 | 1.895 |
| VAE 2 lstm - mode | 300 | 39.35 | 1.893 |
| VAE 2 lstm - mode | 400 | 39.37 | 1.894 |
| VAE 2 lstm - mode | 500 | 39.32 | 1.896 |

Table 3: accuracy for different number of samples

| model | stoch. var. | LL | LL action | LL Time |
|---|---|---|---|---|
| Breakfast dataset | | | | |
| LSTM | - | -6.668 | -1.523 | -5.146 |
| VAE 1 lstm | ✓ | -7.3768 | -2.3095 | -5.2673 |
| VAE 2 lstm | ✓ | -6.5008 | -2.2492 | -4.2517 |
| MultiTUHMOS dataset | | | | |
| LSTM | - | -4.190 | -2.350 | -1.840 |
| VAE 1 lstm - avg | ✓ | -3.5713 | -2.227 | -1.3443 |
| VAE 2 lstm - avg | ✓ | -3.054 | -2.0671 | -0.9869 |

Table 4: Model comparison on Breakfast and MultiTHUMOS datasets.

| Latent size | LL | LL action | LL time |
|---|---|---|---|
| 32 | -3.6354 | -2.2679 | -1.3674 |
| 64 | -3.2064 | -2.1309 | -1.0755 |
| 128 | -3.2359 | -2.1088 | -1.127 |
| 256 | -3.054 | -2.0671 | -0.9869 |
| 512 | -3.35 | -2.1841 | -1.1659 |
| 1024 | | | |

Table 5: CLL for different latent sizes.

FIG. 9

SYSTEM AND METHOD FOR GENERATIVE MODEL FOR STOCHASTIC POINT PROCESSES

CROSS-REFERENCE TO RELATED APPLICATIONS

This application claims priority from U.S. Provisional Patent Application No. 62/768,697 filed on Nov. 16, 2018, and U.S. Provisional Patent Application No. 62/851,385 filed on May 22, 2019, the entire contents of which are incorporated by reference herein.

FIELD

This relates generally to the field of machine learning, and in particular, machine learning for stochastic point processes such as asynchronous action sequences.

BACKGROUND

The task of predicting future events is central to intelligent behaviour. This is a relevant problem in domains ranging from predicting financial transactions, forecasting health related incidents for individuals or communities, to anticipating social activities and life events. It manifests in computer vision research as prediction tasks in videos. Most of the work in this domain has focused on taking frame level data of video as input in order to predict the actions or activities that may occur in the immediate future.

Time series data used for prediction tasks often involves regularly spaced data points, with interesting events occurring sparsely across time. This can occur, for example, in cases of videos with a regular frame rate. However, events or actions of interest may be present only in frames that occur infrequently and at irregular time intervals.

SUMMARY

Action prediction pertains to predicting sequences of future actions, i.e., what are the next actions and when they will happen. This task is challenging because the future is uncertain: several types of actions can happen at different times. Predicting the future involves understanding the sequence of past actions and the temporal dynamics presented. The standard approach to model asynchronous event data in continuous time is to use a framework of temporal point processes (TPPs). Having a robust model for action generation/prediction will not only allow for the generation of reliable action sequences, but also provide a means to infer and reason on the latent relationships between actions, thereby advancing progress in understanding sequences of actions. Despite recent success on modeling synchronous time-series data with recurrent neural network (RNN)/long short-term memory (LSTM)/gated recurrent unit (GRU) based frameworks, modelling asynchronous stochastic discrete events in continuous time still remains a challenging task.

Accordingly, it may be desirable to make predictions about irregularly time-spaced events and to predict events or sequences of actions occurring in the future.

As disclosed herein, a generative model may learn to predict a sequence of possible future events and their start times and end times.

To predict future events in such a scenario, it may be beneficial to consider the history of sparse events (action categories and their temporal occurrence in the above example) alone, instead of regularly spaced frame data.

While the history of frame data (for example, a history of video frames) may contain rich information over and above sparse event history, it may be possible to create a model for predicting events occurring farther into the future by choosing to only model sparse sequence of events. This approach may allow for time series data, that may not be present as data points that are regular across time, to be modeled.

According to an aspect, there is provided a computer-implemented method for predicting a time of arrival of a next action category, the method comprising: observing past actions, determining a conditional distribution of a current action; determining a conditional distribution of a next action; obtaining a latent code from the conditional distributions; determining a distribution of action categories; determining a distribution of inter-arrival times for the action categories; selecting an action category; and determining an inter-arrival time for the selected action category.

According to an aspect, there is provided a computer-implemented method for training a variational auto-encoder model, comprising: receiving data representing actions, the actions including past actions and a current action; generating an action representation of an action category of each of the actions; generating a time representation of inter-arrival times between each of the actions; generating a concatenated representation of each action representation and associated time representation; encoding the concatenated representations of the past actions into a past vector representation; encoding the concatenated representations of the current action into a current vector representation; determining a conditional prior distribution for a next action, based at least in part on the past vector representation; determining a conditional posterior distribution for the current action, based at least in part on the current vector representation; sampling a latent variable from the conditional prior distribution; generating a probability distribution over a current action category; and generating a probability distribution over inter-arrival times for the current action category.

In some embodiments, the computer-implemented method further comprises: optimizing a variational lower bound comprising a difference between a log likelihood of ground truth data and a Kullback-Leibler divergence between the true and conditional posterior distributions.

In some embodiments, the temporal point process distribution follows an exponential distribution.

In some embodiments, the conditional prior distribution is time-variant and a function of all past actions except the current action.

In some embodiments, the conditional prior distribution is a Gaussian distribution.

In some embodiments, the conditional posterior distribution is a Gaussian distribution.

In some embodiments, the conditional prior distribution and the conditional posterior distribution are modelled as a multivariate Gaussian distributions with diagonal covariance.

In some embodiments, the computer-implemented method further comprises modelling the probability distribution over the current action category with a multinomial distribution.

In some embodiments, the computer-implemented method further comprises modelling the probability distribution over inter-arrival times for the current action category with a parameterized exponential distribution.

In some embodiments, the computer-implemented method further comprises modelling the probability distribution over inter-arrival times for the current action category with a non-parametric temporal point process distribution using a normalizing flow framework.

In some embodiments, the encoding the concatenated representations of the past actions into a past vector representation is with a long short-term memory network.

In some embodiments, the encoding the concatenated representations of the current action into a current vector representation is with a long short-term memory network.

In some embodiments, the actions are irregularly spaced in time.

According to another aspect, there is provided a non-transitory computer readable medium comprising a computer readable memory storing computer executable instructions thereon that when executed by a computer cause the computer to: predict probabilities of action categories and probabilities of inter-arrival times of a next action, using a model trained using a method herein.

According to a further aspect, there is provided a computer-implemented method for generating probabilities of action categories and probabilities of inter-arrival times of next action from a sequence of past actions using a variational auto-encoder model, comprising: receiving data representing the past actions; generating an action representation of an action category of each of the past actions; generating a time representation of inter-arrival times between each of the past actions; generating a concatenated representation of each action representation and associated time representation; encoding the concatenated representations into a vector representation; determining a conditional posterior distribution for the next action; sampling a latent variable from the conditional posterior distribution; generating a probability distribution over a next action category; and generating a probability distribution over inter-arrival times for the next action category.

In some embodiments, the encoding the concatenated representations into a current vector representation is with a long short-term memory network.

The computer-implemented method of claim 15, further comprising modelling the probability distribution over the next action category with a multinomial distribution.

In some embodiments, the computer-implemented method further comprises modelling the probability distribution over inter-arrival times for the next action category with a parameterized exponential distribution.

In some embodiments, the computer-implemented method further comprises modelling the probability distribution over inter-arrival times for the next action category with a non-parametric temporal point process distribution using a normalizing flow framework.

In some embodiments, the past actions are irregularly spaced in time.

Other features will become apparent from the drawings in conjunction with the following description.

BRIEF DESCRIPTION OF DRAWINGS

In the figures which illustrate example embodiments,

FIG. 8 illustrates a model comparison on Breakfast and MultiTHUMOS datasets; and FIG. 9 illustrates discussion and conclusion data.

DETAILED DESCRIPTION

Systems and methods are provided herein to model stochastic point process data such as asynchronous action sequences, in particular, within a variational auto-encoder paradigm.

As disclosed herein, given a history of actions, variational autoencoding may be used to generate a distribution over possible future actions, and this operation may be performed recurrently to model diverse sequences of actions that may follow.

The description below focuses on an action prediction task by way of example. It should be understood that the proposed model can be applied to any discrete event prediction tasks in continuous time like the occurrence of earthquakes, financial transactions, user behavior in mobile apps, actions in videos, including human activity such as sports, and the like.

In some embodiments, a non-parametric intensity function for stochastic point process based on normalizing flows may be implemented. In some embodiments, a joint modeling framework may be implemented for the distribution of temporal variability conditioned on an action category.

Figure 1:
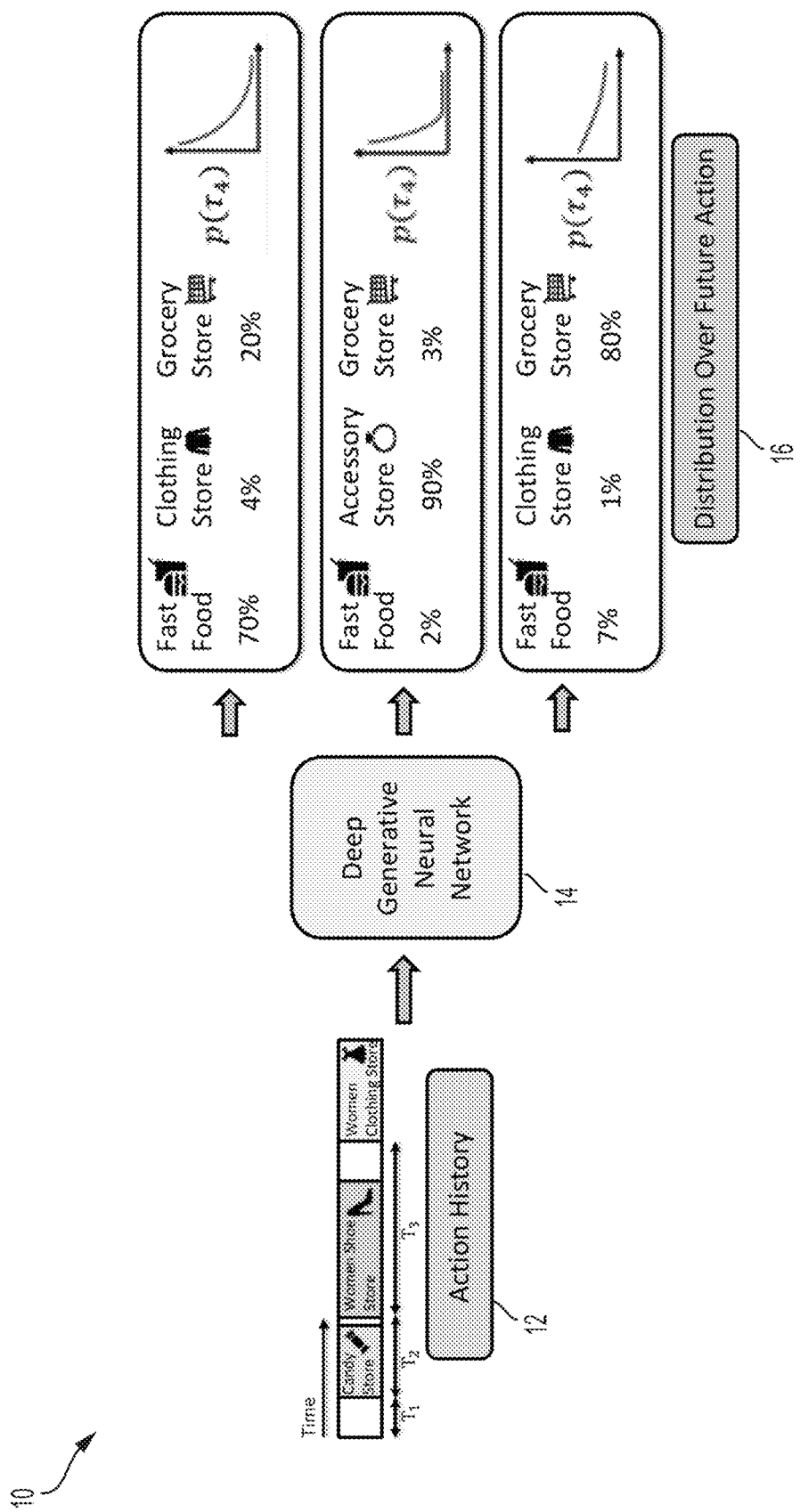
FIG. 1 is a schematic of an example of an asynchronous action sequence modeling, according to an embodiment.

FIG. 1 illustrates an example of an asynchronous action sequence modeling 10 based on an action history 12 over time in the form of transaction data for actions (transactions) taking place at $T_1$ at a candy store, at $T_2$ at a women's shoe store, and at $T_3$ at a women's clothing store, whereby $T_1$, $T_2$, and $T_3$ are inter-arrival times between each transaction, or action. The action history is input to a deep generative neural network 14, such as a Variational Autoencoder (VAE) model 110 as described herein, to generate a distribution over future actions 16 to predict a future action such as "Fast Food", "Clothing Store" and "Grocery Store", and associated probabilities.

Methods of predicting future action including asynchronous action prediction, early stage action prediction, activity prediction and video prediction, are described in further detail, below. Full reference citations for references indicated by square brackets herein are provided below.

Most activity prediction tasks are frame-based, i.e., the input to the model is a sequence of frames before the action starts and the task is to predict what will happen next. Lan et al [15] predict future actions from hierarchical representations of short clips by having different classifiers at each level in a max-margin framework. Mahmud et al [17] jointly predicts future activity as well as its starting time by a multi-streams framework. Each streams tries to catch different features for having a richer feature representation for future prediction: One stream for visual information, one for previous activities and the last one focusing on the last activity.

Farha [1] proposed a framework for predicting the action categories of a sequence of future activities as well as their starting and ending time. Farha proposed two deterministic models, one using a combination of RNN and HMM and the other one is a CNN predicting a matrix which future actions are encoded in it.

Asynchronous Action Prediction refers to the task of predicting future action given a sequence of previous actions that are asynchronous in time. Du et al [6] proposed a recurrent temporal model for learning the next activity timing and category given the history of previous actions. The Du et al recurrent model learns a non-linear map of history to the intensity function of a temporal point process framework.

Zhong et al [31] also introduced a hierarchical recurrent network model for future action prediction for modeling future action timing and category. The Zhong et al model takes frame-level information as well as sparse high-level events information in the history to learn the intensity function of a temporal point process.

Xiao et al [28] introduced an intensity-free generative method for temporal point process. The generative part of the Xiao et al model is an extension of Wasserstein GAN in the context of temporal point process for learning to generate sequences of action.

Early Stage Action Prediction refers to predicting the action given the initial frames of the activity [16] [10] [24]. Recently, Yu et al [30] used variational auto encoder to learn from the frames in the history and transfer them into the future. Sadegh Aliakbarian et al [23] combine context and action information using a new multi-stage LSTM model to predict future action. The model is trained with a new loss function which encourage the model to predict action with the least observation. Gao et al [8] proposed to use a Reinforced Encoder-Decoder network for future activity prediction. Damen et al [2] proposed a semi-supervised variational recurrent neural network to model human activity including classification, prediction, detection and anticipation of human activities.

Conveniently, models as disclosed herein may differ from traditional early action prediction as the models may not have any information about an action while predicting it.

Video prediction has recently been studied in several works. Denton and Fergus [5] use variational autoencoder framework with a learned prior to generate future video frames. He et al [9] also proposed a generative model for future prediction. He structures the latent space by adding control features which makes the model able to control generation. Vondrick et al [27] uses adversarial learning for generating videos of future with transforming the past pixels. Pătrăucean et al [20] describe a spatio-temporal auto-encoder that predicts optical flow as a dense map, using reconstruction in its learning criterion. Villegas et al [26] propose a hierarchical approach to pixel-level video generation, reasoning over body pose before rendering into a predicted future frame.

A variational auto-encoder (VAE) [13] describes a generative process with simple prior $p_\theta(z)$ (usually chosen to be a multivariate Gaussian) and complex likelihood $p_\theta(x|z)$ (the parameters of which are produced by neural networks). x and z are observed and latent variables, respectively. Approximating the intractable posterior $p_\theta(z|x)$ with a recognition neural network $g_\phi(z|x)$, the parameters of the generative model θ as well as the recognition model φ can be jointly optimized by maximizing the evidence lower bound $\mathcal{L}$ on the marginal likelihood $p_\theta(x)$:

$$\log p_\theta(x) = KL(q_\phi \| p_\theta) + \mathcal{L}(\theta, \phi) \geq \mathcal{L}(\theta, \phi) = -\mathbb{E}_{q_\phi}\left[\log \frac{q_\phi(z|x)}{p_\theta(z, x)}\right] \quad (1)$$

Recent works expand VAEs to time-series data including video [5, 9], text, or audio. A popular design choice of such models is the integration of a per time-step VAE with RNN/LSTM temporal modelling. The evidence lower bound (ELBO) thus becomes a summation of time-step-wise variational lower bound (Note that variants exist, depending on the exact form of the recurrent structure and its VAE instantiation.):

$$\mathcal{L}(\theta, \phi, \psi) = \sum_{n=1}^{N} \Big[ \mathbb{E}_{q_\phi(z_{1:n}|x_{1:n})}[\log p_\theta(x_n | x_{1:n-1}, z_{1:n})] - KL(q_\phi(z_n | x_{1:n}) \| p_\psi(z_n | x_{1:n-1})) \Big] \quad (2)$$

with a "prior" $p_\psi(z_n|x_{1:n-1})$ that evolves over the N time steps used. Variants exist, depending on the exact form of the recurrent structure and its VAE instantiation.

Normalizing flow was first introduced in the context of density estimation. It was proposed to use additive coupling layers, a set of invertible transformation for density estimation. Normalizing flow was also introduced in the context of learning rich proposal distributions in variational auto encoders. With normalizing flow, a complex posterior distribution was constructed by transforming samples of a simple distribution into the complex one. Later on, more powerful sets of bijective functions for density estimation were introduced. A recent work expanded normalizing flow to time series data by having shared flows across time-steps and an auto regressive prior distribution which is conditioned on the past history.

A (finite) normalizing flow (NF), or flow is an invertible function $f_\theta: X \to Y$ (with $g=f^{-1}$), used to express a transformation between random variables. Since $f$ is invertible, the change of variables formula can be used to translate between probability density functions of $p_Y(y)$ and $p_X(x)$. That is, the following equality holds:

$$p_X(x) = p_Z(f(x)) \left| \det\left(\frac{\partial f(x)}{\partial x^T}\right) \right| \quad (3)$$

$$\log p_X(x) = \log p_Z(f(x)) + \log\left(\left|\det\left(\frac{\partial f(x)}{\partial x^T}\right)\right|\right) \quad (4)$$

where $\frac{\partial f(x)}{\partial x^T}$ is the Jacobian of $f$ at x.

A temporal point process may model the intensity as a non-linear function of past actions history using recurrent neural networks. In one model, the history of past actions is taken into consideration and two distributions are generated over the future action category and action timing. Intensity may also be modeled using LSTM, where both frame-level data as well as asynchronous action are taken as input, and the distribution is modeled over future action.

There are also intensity-free non-parametric formulations of temporal point process distribution using generative adversarial networks. Such formulations do not have any assumption on the functional form of the distribution over inter-arrival time. There is also a conditional generative adversarial framework for asynchronous event prediction, where a point process distribution does not have a parametric form, and is modeled within a generative framework.

Recently, the asynchronous event prediction was formulated with reinforcement learning, such that predicting the future event is treated as the action taken by the agent and learning the intensity function is equal to policy learning by reinforcement learning.

One problem in temporal point process (TPP) is how to design the intensity function. A well-designed intensity function which fits the actual distribution better can lead to improved performance. However, coming up with a good intensity function has long been a bottleneck in temporal point process models, prohibiting a wider adaption of such models. In some embodiments, to overcome this limitation, instead of using a pre-defined parametric distributions, the intensity function may be modelled as a complex non-parametric distribution. In order to achieve this, normalizing flow may be utilized to map a simple latent distribution to a complex multi-modal distribution for intensity function.

A temporal point process (TPP) is a stochastic model used to capture the inter-arrival times of a series of events. It is a mathematical tool for modeling the inter-arrival arrival time between events as random variables. A temporal point process is characterized by the conditional intensity function $\lambda(\tau_n | x_{1:n-1})$ which is conditioned on the past events $x_{1:n-1}$ (e.g., action in the examples described below). The conditional intensity encodes instantaneous probabilities at time $\tau$. Given the history of n−1 past actions, the probability density function for the time of the next action is:

$$f(\tau_n | x_{1:n-1}) = \lambda(\tau_n | x_{1:n-1}) e^{-\int_0^{\tau_n} \lambda(u | x_{1:n-1}) du} \quad (5)$$

Much of the research on this topic has focused on designing the functional form of the intensity function. For example, the Poisson process is a popular temporal point process, which assumes that events occur independent of one another. The conditional intensity is $\lambda(\tau_n | x_{1:n-1}) = \lambda$ where $\lambda$ is a positive constant. More complex conditional intensities have been proposed like Hawkes Process and Self-Correcting Process. All these conditional intensity functions seek to capture some forms of dependency on the past action.

Recent works propose to learn a more general representation by assuming the intensity to be a non-linear map of the action history using recurrent neural networks. They are still limited to the exponential form of temporal point process distribution. However, in practice the true distribution might be much more complex and multi-modal which cannot be captured with exponential type distributions.

To address this problem, an intensity-free generative modeling of temporal point process using Generative Adversarial Networks (GAN) was introduced so that there is no assumption on the functional form of the temporal point process distribution.

In some embodiments disclosed herein, a recurrent model may be learned that estimates the conditional intensity based on a history of actions.

In some embodiments disclosed herein, a non-parametric temporal point process distribution using a normalizing flow framework may be implemented. Using such a model, complex distribution over the timing of asynchronous events may be learned.

Figure 2:
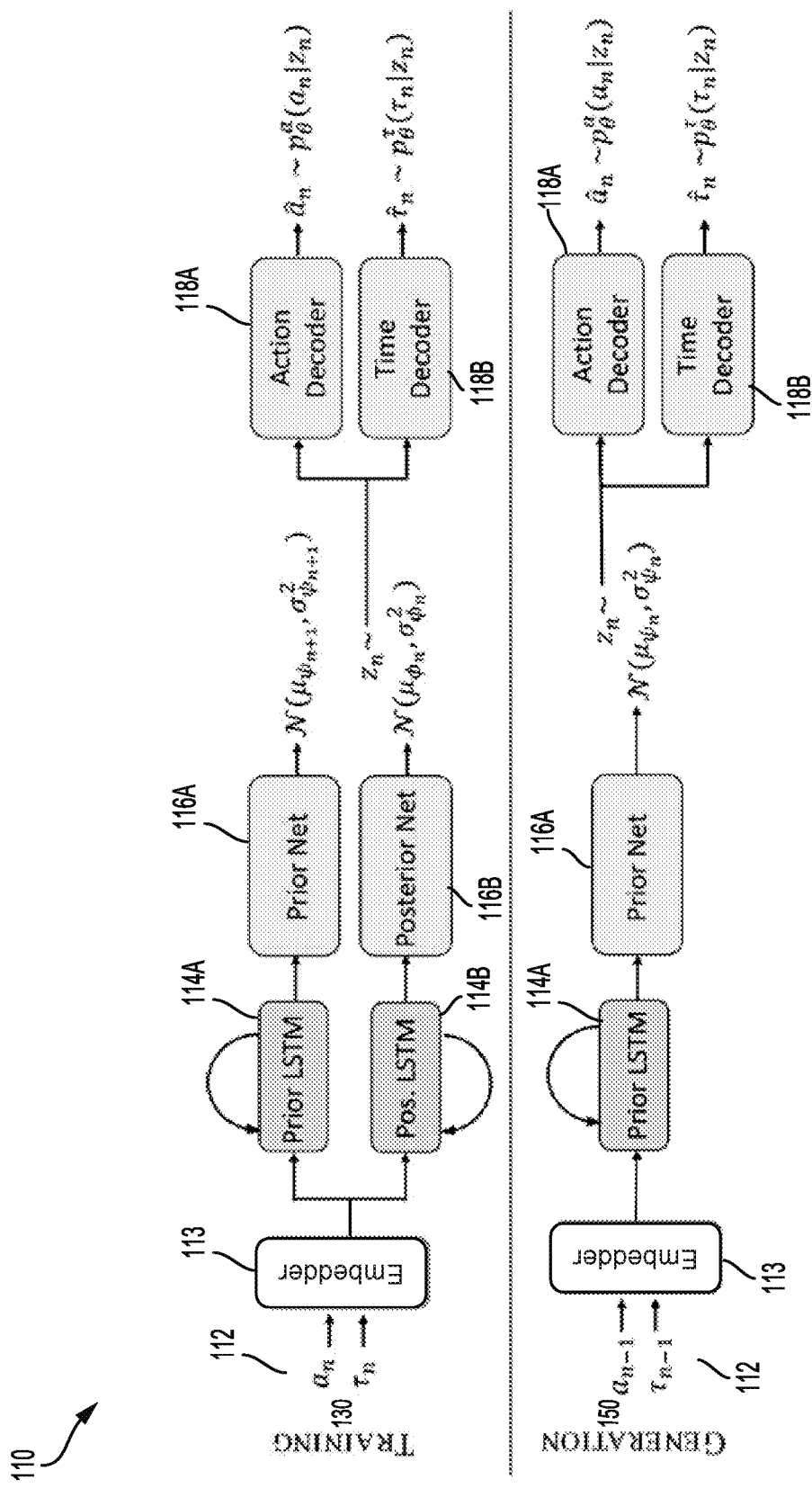
FIG. 2 is a schematic block diagram of the architecture of a Variational Autoencoder (VAE) model, according to an embodiment.
Figure 4:
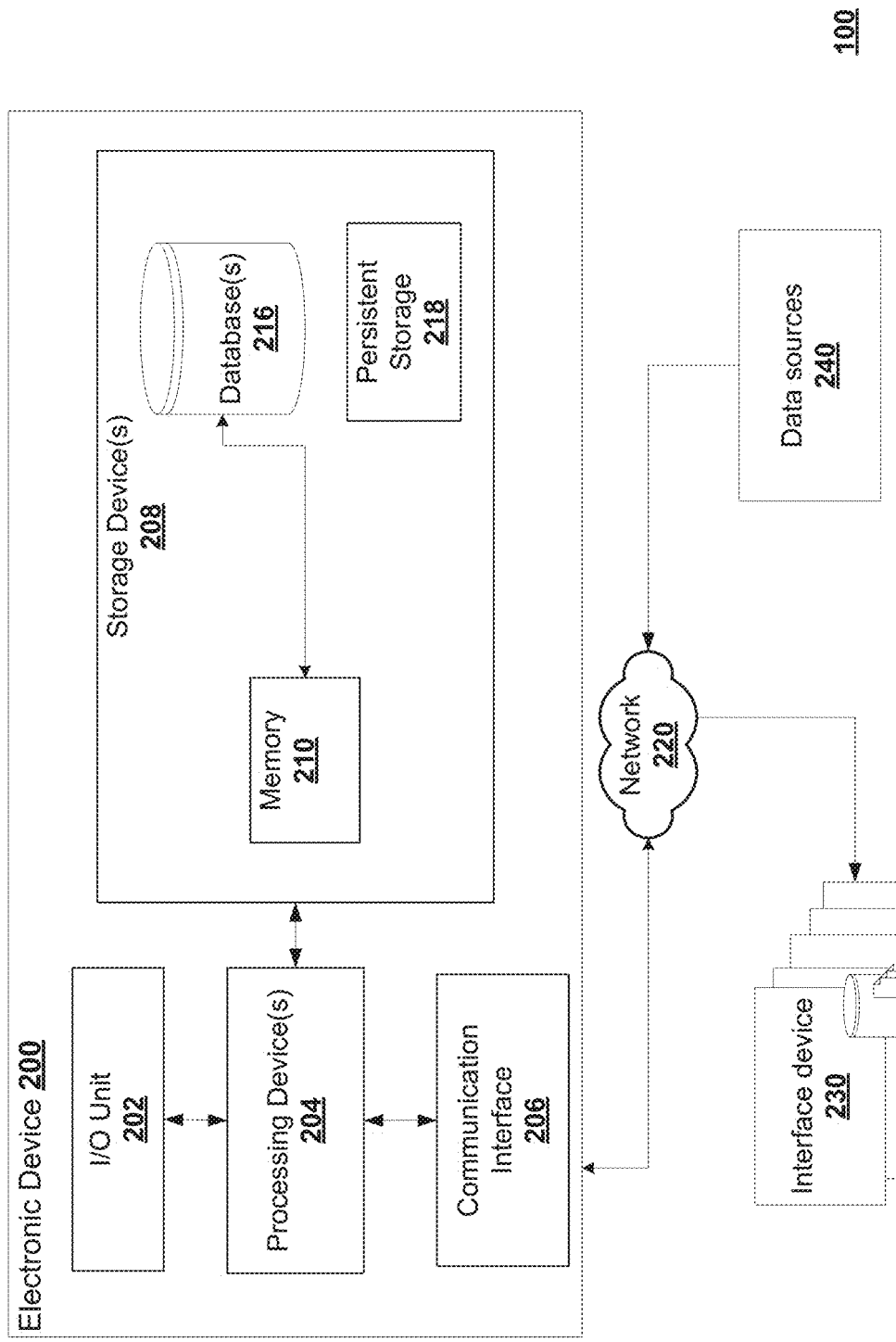
FIG. 4 is a schematic block diagram of a system for machine learning event prediction, according to an embodiment.

FIG. 2 is a schematic block diagram of the architecture of a Variational Autoencoder (VAE) model 110, in a learning or training phase 130 and a generation phase 140. VAE model 110 may be used for machine learning event prediction and implemented by a system 100, such as that as shown in FIG. 4.

VAE model 110 is a generative model for asynchronous future action prediction using a variational autoencoder framework. VAE model 110 generates distributions over the future action timing and category.

FIG. 2 shows a single time slice of VAE model 110 at time step n. As illustrated, VAE model 110 includes an embedder 113, a prior Long Short Term Memory (LSTM) 114A, a posterior Long Short Term Memory (LSTM) 114b, a prior network 116A, a posterior network 116B, an action decoder 118A and a time decoder 118B, as described in further detail below.

At each time step n, VAE model 110 uses the history of actions and inter-arrival times to generate a distribution (e.g., $\mathcal{N}(\mu_{\phi_n}, \sigma_{\phi_n}^2)$) over latent codes a sample (e.g., $z_n$) of which is then decoded into two probability distributions for the next action: one over possible action labels (e.g., $\hat{a}_n \sim p_\theta^a(a_n | z_n)$) and one over the inter arrival time (e.g., $\hat{\tau}_n \sim p_\theta^\tau(\tau_n | z_n)$).

In some embodiments, an asynchronous action prediction may be formulated as a problem definition as follows. An input may be a sequence of actions $x_{1:n} = (x_1, \ldots, x_n)$ noted with their inter-arrival time, where $x_n$ is the n-th action. Each tuple of action and inter-arrival time in the sequence may be denoted as $x_n = (a_n, \tau_n)$, represented by the action category $a_n \in \{1, 2, \ldots, K\}$ (K discrete action classes) and the inter-arrival time $\tau_n \in \mathbb{R}^+$. The inter arrival time $\tau_n$ is the difference between start times of action $x_{n-1}$ and $x_n$.

An asynchronous action distribution modeling task may be formulated as: given a sequence of actions $x_{1:n-1}$ (a sequence of actions $a_1, a_2, \ldots a_{n-1}$, and their corresponding inter-arrival times $\tau_1, \tau_2, \ldots \tau_{n-1}$), the goal may be to produce a distribution (prediction) over what action $a_n$ will happen next, and the inter arrival time $\tau_n$. Probabilistic models may be used to capture uncertainty over the action sequence modeling.

An input sequence of actions and inter arrival times may be encoded using VAE model 110. At each step, VAE model 110 uses the history of actions and inter arrival times to predict a latent code $z_n$, which is then decoded into two probability distributions: one over the possible actions that occur next, and another over the inter-arrival time for the next action.

The architecture of VAE model 110 will now be described in more detail. At step n, the current action and its inter-arrival time, $x_n$, are embedded into a vector representation $x_n^{emb}$. Embedder 113 may be configured to perform a two-step embedding strategy. First, a representation ($a_n^{emb}$) is computed for the action category ($a_n$) and a representation ($\tau_n^{emb}$) is computed for the inter-arrival time ($\tau_n$), separately. Then, these two representations may be concatenated and a new representation $x_n^{emb}$, of the pair action and inter-arrival time, is calculated:

$$a_n^{emb} = f_a^{emb}(a_n) \quad \tau_n^{emb} = f_\tau^{emb}(\tau_n) \quad (6)$$

$$x_n^{emb} = f_{a,\tau}^{emb}([a_n^{emb}, \tau_n^{emb}]) \quad (7)$$

One-hot encoding may be used to represent action category label $a_n$. Embedder 113 may be implemented as neural networks, and embed into a first two vector representations in the first step and a second vector representation in the second step.

In some embodiments, embedder 113 includes 2-layer MLPs with ReLU activation, through which action category and inter-arrival time inputs are each passed through, and then concatenated and followed with a linear layer.

As shown in FIG. 2, the $x_n^{emb}$ vector representation from embedder 113 is then fed into two branches: one to estimate the parameters of the posterior distribution and another to estimate the parameters of the prior distribution. The network architecture of these two branches may be similar, but separate networks may be used because the prior and the posterior distribution capture different information.

In some embodiments, at step n, the previous and current actions and their inter-arrival times (i.e., $x_{n-1}$ and $x_n$) may be embedded by separate embedders 113 into respective vector representations. A two-step embedding strategy may be used. First, a representation is computed for the action and the inter-arrival time separately (for each of the previous and current actions). Then, these two representations (for each of the previous and current actions) may be concatenated and a new representation of the pair action and inter arrival time, is calculated (for each of the previous and current actions). The previous and current vector representations are then fed into the two branches, prior LSTM 114A and posterior LSTM 114B, respectively.

Each branch has a Long Short Term Memory (LSTM) [11], a prior LSTM 114A and a posterior LSTM 114B, respectively, to model recurrence and encode the current action and the past actions into a vector representation.

$$h_n^{post} = \text{LSTM}_\phi(x_n^{emb}, h_{n-1}^{post}) \qquad (8)$$

$$h_n^{prior} = \text{LSTM}_\psi(x_n^{emb}, h_{n-1}^{prior}) \qquad (9)$$

Recurrent networks such as prior LSTM 114A and posterior LSTM 114B turn variable length sequences into meaningful, fixed-sized representations.

Returning arrows of prior LSTM 114A and posterior LSTM 114B shown in FIG. 2 represent internal memory over time. It will be understood that LSTM 114A and posterior LSTM 114B may be any suitable LSTM.

In some embodiments, hidden state of one or both of prior LSTM 114A and posterior LSTM 114B is 128.

The output of prior LSTM 114A, $h_n^{prior}$, is passed into prior network 116A, $f_\psi^{prior}$, that outputs the parameters of the Gaussian distribution:

$$\mu_{\psi_n}, \sigma_{\psi_n}^2 = f_\psi^{prior}(h_n^{prior}) \qquad (10)$$

The output of posterior LSTM 114B, $h_n^{post}$, is passed into posterior network 116B, $f_\phi^{post}$, that outputs the parameters of the Gaussian distribution:

$$\mu_{\phi_n}, \sigma_{\phi_n}^2 = f_\phi^{post}(h_n^{post}) \qquad (11)$$

Prior network 116A and posterior network 116B may be slightly different from each other. Posterior network 116A generates distributions over what will happen at next time step (n+1). Posterior network 116B infers what may happen later—what may happen based upon current time. Posterior network 116B refers to time step n and information up to time step n.

In some embodiments, one or both of prior network 116A and posterior network 116B include 2-layer MLPs with ReLU activation after the first layer.

VAE model 110 may also be capable of generating sequences about the future. Prior network 116A may be used to generate sequences of future events for e.g. for a person, for example, generate likely futures for that person. VAE model 110 may not continue with observations from prior network 116A—these are generated distributions over the future that could happen, and may be simply used as observations.

A latent variable $z_n$ may be sampled from the posterior (or prior during testing) distribution, and is fed to decoder networks action decoder 118A and time decoder 118B for generating distributions over action category $a_n$ and inter-arrival time $\tau_n$.

In some embodiments, a dimension of the latent code is 256.

In some embodiments, action decoder 118A, the decoder network for action category $f_\theta^a(z_n)$, is a multi-layer perceptron with a softmax output to generate a probability distribution modeled in Equation (17), detailed below:

$$p_\theta^a(a_n|z_n) = f_\theta^a(z_n) \qquad (12)$$

In some embodiments, action decoder 118A includes a 3-layer MLP with ReLU at the first two layers and softmax for the last layer.

In some embodiments, time decoder 118B, the decoder network for inter-arrival time $f_\theta^\tau(z_n)$, is another multi-layer perceptron, producing the parameter for the point process model for temporal distribution modeled in Equation (18), detailed below:

$$\lambda(z_n) = f_\theta^\tau(z_n) \qquad (13)$$

In some embodiments, time decoder 118B is a 3-layer MLP with ReLU at the first two layers, with an exponential non-linearity applied to the output so that the parameter of the point process is positive.

Figure 3:
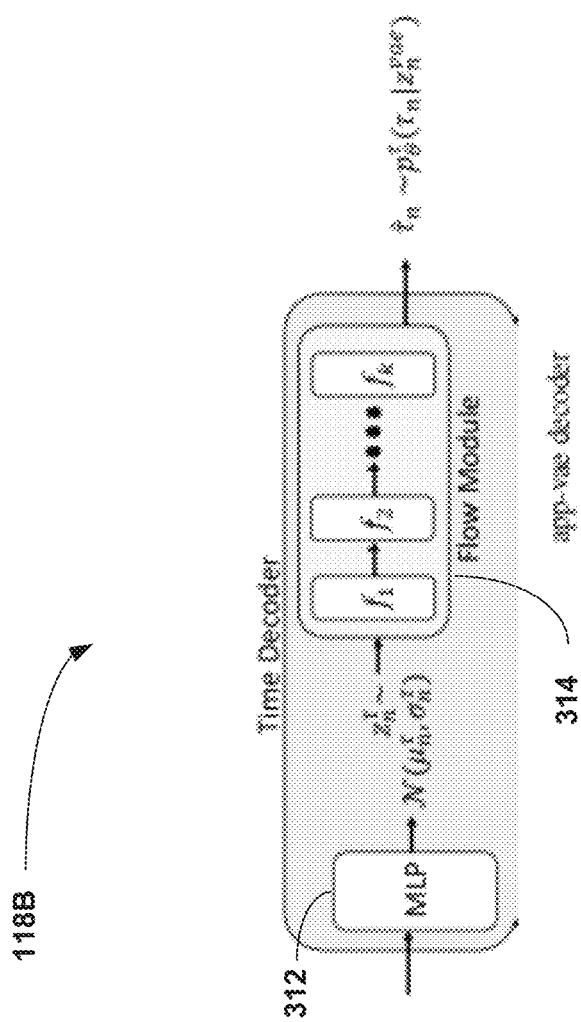
FIG. 3 is a schematic block diagram of a time decoder of the VAE model of FIG. 2, according to an embodiment.

FIG. 3 illustrates an example of a time decoder 118B, in an embodiment. The input to the time decoder 118B is a vector that is fed into a multilayer perceptron (MLP) 312 such as a recurrent neural network or LSTM. The MPL 312 then converts the vector into a distribution (e.g., $\mathcal{N}(\mu_{\tau_n}, \sigma_{\tau_n}^2)$) from which a sample (e.g., $z_n$) is drawn and fed into a flow module 314 comprising a sequence of neural networks $f_1, f_2, \ldots, f_k$ to output a predicted time distribution $\hat{\tau}_n \sim p_\theta^\tau(\tau_n|z_n)$.

During training 130, the parameters of all the modules may be jointly learned in an end-to-end fashion.

At a step n during training 130, VAE model 110 takes as input 112 the pair $x_n = (a_n, \tau_n)$, which is the target of the prediction model, and the history of past actions with their inter-arrival time $x_{1:n-1}$. These inputs may be used to compute a conditional distribution $q_\phi(z_n|x_{1:n})$ from which a latent code $z_n$ is sampled.

Since the true distribution over latent variables $z_n$ is intractable, a time-dependent inference network, posterior network 116B, $q_\phi(z_t|x_{1:t})$ approximates $z_n$ with a conditional Gaussian distribution $\mathcal{N}(\mu_{\phi_n}, \sigma_{\phi_n}^2)$.

To prevent $z_n$ from copying $x_n$, $q_\phi(z_n|x_{1:n})$ may be forced to be close to the prior distribution $p(z_n)$ using a KL (Kullback-Leibler) divergence term.

In some embodiments, $p(z_n)$ is a fixed Gaussian $\mathcal{N}(0,I)$. However, with a fixed prior, samples at each time step are drawn randomly, and thus ignore temporal dependencies present between actions.

In some embodiments, a prior may be modeled that varies over time, being a function of all past actions except the current action $p_\psi(z_{n+1}|x_{1:n})$.

Thus, prior network 116A computes a prior distribution $p_\psi(z_{n+1}|x_{1:n})$ for the next action category $a_{n+1}$ and its inter arrival time $\tau_{n+1}$. Posterior network 116B computes a distribution $q_\phi(z_n|x_{1:n})$ which approximates the unknown and intractable posterior $p(z_n|x_{1:n})$.

Both prior and approximate posterior distributions are modelled as multivariate Gaussian distributions with diagonal covariance with parameters as shown below:

$$q_\phi(x_n|x_{1:n}) = \mathcal{N}(\mu_{\phi_n}, \sigma_{\phi_n}^2) \qquad (14)$$

$$p_\psi(x_{n+1}|x_{1:n}) = \mathcal{N}(\mu_{\psi_{n+1}}, \sigma_{\psi_{n+1}}^2) \qquad (15)$$

At step n, both posterior network 116B and prior network 116A observe actions $x_{1:n}$. Posterior network 116B outputs parameters of a conditional Gaussian distribution for the current action $x_n$. Prior network 116A outputs parameters of a conditional Gaussian distribution for the next action $x_{n+1}$.

At each time-step during training 130, a latent variable $z_n$ is drawn from the posterior distribution $q_\phi(z_n|x_{1:n})$ and is fed to action decoder 118A and time decoder 118B.

Output action $\hat{x}_n = (\hat{a}_n, \hat{\tau}_n)$ is sampled from the distribution $p_\theta(x_n|z_n)$ of the conditional generative model which is parameterized by $\theta$.

For mathematical convenience, it may be assumed that the action category and inter-arrival time are conditionally independent given latent code $z_n$:

$$p\theta(x_n|z_n) = p_\theta(a_n,\tau_n|z_n) = p_\theta^a(a_n|z_n)p_\theta^\tau(\tau_n|z_n) \qquad (16)$$

where $p_\theta^a(a_n|z_n)$ is a conditional generative model for action category, and $p_\theta^\tau(\tau_n|z_n)$ is a conditional generative model for inter-arrival time, a standard assumption in event prediction.

Decoders 118A, 118B generate two probability distributions, respectively: (i) a categorical distribution over the future action categories and (ii) a temporal point process distribution over the inter-arrival times for the next action.

While conditionally independent distributions are described for action and time, it will be appreciated that the distribution can also be linked in a more general setting, and generalized by using conditioning on a for the distribution over $\tau$. In an example, there may be a link from the action decoder 118A to the time decoder 118B where $\hat{a}_n$ is provided by the action decoder 118A and concatenated with the sample $z_n$ as an input to the time decoder 118B.

Distribution over action categories may be modeled by action decoder 118A as follows:

$$p_\theta^a(a_n = k|z_n) = p_k(z_n) \qquad (17)$$

and $$\sum_{k=1}^{K} p_k(z_n) = 1$$

where $p_k(z_n)$ is the probability of occurrence of action k, and K is the total number of action categories.

Inter-arrival time of the future action may be modeled by time decoder 118B to follow an exponential distribution parametrized by $\lambda(z_n)$, similar to a standard temporal point process $$p_\theta^\tau(\tau_n|z_n) = \begin{cases} \lambda(z_n)e^{-\lambda(z_n)\tau_n} & \text{if } \tau_n \geq 0 \\ 0 & \text{if } \tau_n < 0 \end{cases}$$

model: (18)
where $p_\theta^\tau(\tau_n|z_n)$ is a probability density function over random variable $\tau_n$ taking a value t and $\lambda(z_n)$ is the intensity of the process, which depends on the latent variable sample $z_n$.

In some embodiments, the distribution over the inter-arrival time modeled by time decoder 118B does not have a parametric form. This distribution may be learned using normalizing flow, by transforming a base probability density through a series of invertible transformations. Here, the inter-arrival $\tau_n$ is modeled as it was first generated from a latent space $p_\theta(z_n^\tau|z_n)$, then transformed to $\tau_n$ through an invertible transformation:

$$z_n^\tau \sim p_\theta(z_n^\tau|z_n) \qquad (19)$$

$$\tau_n = g_\theta(z_n^\tau) \qquad (20)$$

where $z_n^\tau$ is the latent variable for inter-arrival time and $p_\theta(z_n^\tau|z_n)$ has a simple, tractable density, such as a spherical multivariate Gaussian distribution: $\mathcal{N}(\mu_{\tau_n}, \sigma_{\tau_n}^2)$. The function $g_\theta$ is invertible (also called bijective) such that given a data point $\tau_n$, latent variable inference is performed by $z_n^\tau = f_\theta(\tau_n) = g_\theta^{-1}(\tau_n)$.

In some embodiments, function $f$ (and, likewise, $g$) is composed of a sequence of invertible transformations: $f = f_1 \circ f_2 \circ \ldots \circ f_K$. Each function $f$ comprises a neural network. Under the change of variables formula of Equation (4), the probability density function of inter-arrival time given $\tau_n$ can be written as:

$$\log p_\theta^\tau(\tau_n|z_n) = \log p_\theta(z_n^\tau|z_n) + \log\left|\det\left(\frac{dz_n^\tau}{d\tau_n}\right)\right| \qquad (21)$$

$$= \log p_\theta(z_n^\tau|z_n) + \sum_{i=1}^{K} \log\left|\det\left(\frac{dh_i}{dh_{i-1}}\right)\right| \qquad (22)$$

where $h_0 \triangleq \tau_n$ and $h_K \triangleq z_n^\tau$.

As such, VAE model 110 may be extended by learning a non-parametric distribution over action inter-arrival time, providing a non-parametric stochastic point process.

VAE model 110 may be trained by maximizing the variational lower bound over the entire sequence comprised of N steps:

$$\mathcal{L}_{\theta,\phi}(x_{1:N}) = \qquad (23)$$

$$\sum_{n=1}^{N}\left(\mathbb{E}_{q_\phi(z_n|x_{1:n})}[\log p_\theta(x_n|z_n)] - D_{KL}(q_\phi(z_n|x_{1:n})\|p_\psi(z_n|x_{1:n-1}))\right)$$

Because the action category and inter-arrival time are conditionally independent given the latent code $z_n$, the log-likelihood term can be written as follows:

$$E_{q_\phi(z_n|x_{1:n})}[\log p_\theta(x_n|z_n)] = E_{q_\phi(z_n|x_{1:n})}[\log p_\theta^a(a_n|z_n)] + E_{q_\phi(z_n|x_{1:n})}[\log p_\theta^\tau(\tau_n|z_n)] \qquad (24)$$

Given the form of $p_\theta^a$ the log-likelihood term can reduce to a cross entropy between the predicted action category distribution $p_\theta^a(a_n|z_n)$ and the ground truth label $a^*_n$. Given the ground truth inter-arrival time in, its log-likelihood can be computed over a small time interval $\Delta_\tau$ under the predicted distribution.

$$\log[\int_{\tau^*_n}^{\tau^*_n + \Delta_\tau} p_\theta^\tau(\tau_n|z_n) d\tau_n] = \log(1 - e^{-\lambda(z_n)\Delta_\tau}) - \lambda(z_n)\tau^*_n \qquad (25)$$

Given the ground truth inter-arrival time $\tau_n^*$, its log-likelihood may be computed using the formula given in Equation (22).

A re-parameterization technique may be used to sample from the encoder network $q_\phi$.

As shown in FIG. 2, at a generation phase 140, VAE model 110 may be used to generate a next action $\hat{x}_n = (\hat{a}_n, \hat{\tau}_n)$ given a sequence of past actions $x_{1:n-1}$. At test time, an action at step n is generated by first sampling $\hat{z}_n$ from the prior distribution $p\psi(z_n|x_{1:n-1})$ generated by prior network 116A. The parameters of the prior distribution are computed based on the past n−1 actions Then, an action category $\hat{a}_n$ is generated by action decoder 118A, $\hat{a}_n \sim p_\theta{}^a(a_n|\hat{z}_n)$, and inter-arrival time $\hat{\tau}_n$ is generated by time decoder 118B, $\hat{\tau}_n \sim p_\theta{}^\tau(\tau_n|\hat{z}_n)$.

In some embodiments, inter-arrival time $\hat{\tau}_n$ is generated by first generating the conditional base density distribution $\mathcal{N}(\mu_{\tau_n}, \sigma_{\tau_n}^2)$, drawing a sample from it, and passing it to the inverse of flow as follows:

$$\hat{z}_n^\tau \sim \mathcal{N}(\mu_{\tau_n}, \sigma_{\tau_n}^2) \tag{26}$$

$$g_\theta(\hat{z}_n^\tau) = \hat{\tau}_n \tag{27}$$

FIG. 4 is a schematic block diagram of a system 100 for machine learning event prediction. System 100, and components such as VAE model 110 for asynchronous action sequence modeling, may be implemented as software and/or hardware. In an example, system 100 has an electronic device 200 connected to interface device 230 and data sources 240 via network 220.

Figure 5:
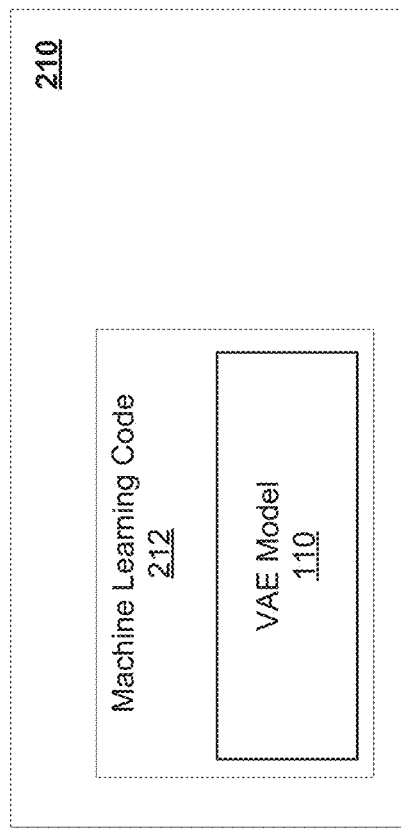
FIG. 5 illustrates the organization of software at a computing device of FIG. 4, according to an embodiment.

FIG. 5 depicts a simplified organization of example software components and data stored within memory 210 of electronic device 200. As illustrated, these software components include machine learning code 212 including VAE model 110.

The electronic device 200, for example, a computing device such as a server, can include an I/O unit 202, processing device(s) 204, communication interface 206, and storage device(s) 208. The electronic device 200 can connect with one or more interface devices 230 or data sources 240. This connection may be over a network 220 (or multiple networks). The electronic device 200 receives and transmits data from one or more of these via I/O unit 111. When data is received, I/O unit 111 transmits the data to processing device 112.

Each I/O unit 111 can enable the electronic device 200 to interconnect with one or more input devices, such as a keyboard, mouse, camera, touch screen and a microphone, and/or with one or more output devices such as a display screen and a speaker.

A processing device 204 can execute instructions (e.g., machine learning code 212) in memory 210 to configure electronic device 200. The processing device 204 can dynamically update machine learning code 212. A processing device 204 can be, for example, any type of general-purpose microprocessor or microcontroller, a digital signal processing (DSP) processor, an integrated circuit, a field programmable gate array (FPGA), a reconfigurable processor, or any combination thereof.

The storage device 208 can include memory 210, databases 216 and persistent storage 218. Memory 210 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 210 can include machine learning code 212 with and rules and models such as VAE model 110. Machine learning code 212 can refine based on learning. Machine learning code 212 can include instructions to implement an artificial neural network, such as an RNN with LSTM nodes arranged in layers.

Each communication interface 206 can enable the electronic device 200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The electronic device 200 can be operable to register and authenticate users (using a login, unique identifier, and password for example) prior to providing access to applications, a local network, network resources, other networks and network security devices. The system 100 may serve one user or multiple users.

The storage device 208 may be configured to store information associated with or created by the machine learning code 212. Storage 208 and/or persistent storage 218 may be provided using various types of storage technologies, such as solid state drives, hard disk drives, flash memory, and may be stored in various formats, such as relational databases, non-relational databases, flat files, spreadsheets, extended markup files, etc.

Returning to FIG. 5, machine learning code 212 may include one or more submodules. As illustrated, in some embodiments, machine learning code 212 can be configured to model point process data, such as asynchronous action sequences, with a model such as VAE model 110. In some embodiments, the model may comprise a latent variable model including normalizing flow, such as a VAE or an action point process-VAE including normalizing flow.

Figure 6:
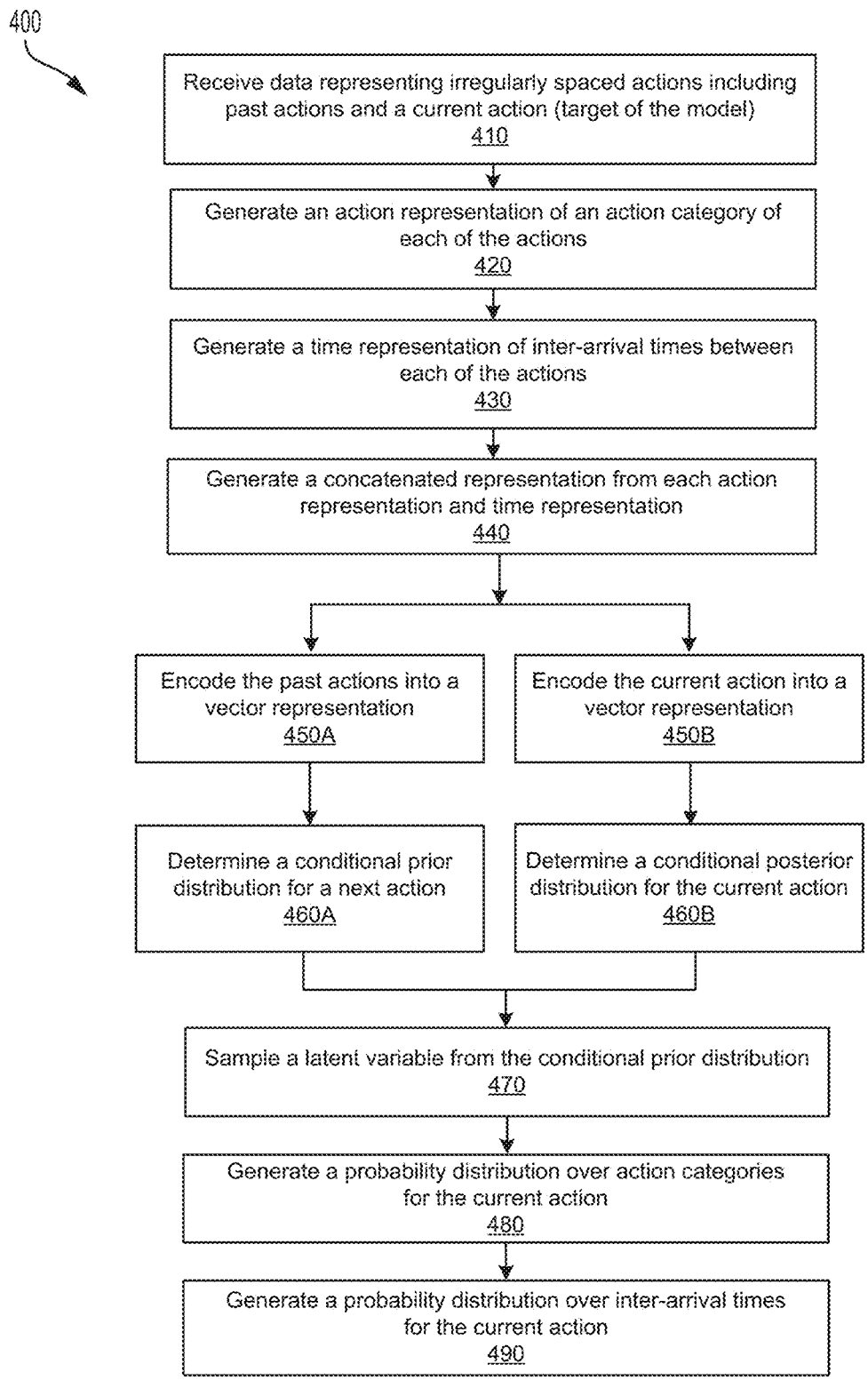
FIG. 6 is a flowchart of a method for training a VAE model, according to an embodiment.

The operation of machine learning code 212 is described with reference to the flowchart of FIG. 6. FIG. 6 is a flowchart of a method 400 for training a variational auto-encoder model, such as VAE model 110 implemented by system 100. Method 400, in particular one or more of blocks 410 to 490, may be performed for each time-step n of a sequence of n actions. The blocks are provided for illustrative purposes. Variations of the blocks, omission or substitution of various blocks, or additional blocks may be considered.

Method 400, in particular, one or more of blocks 410 to 490, may be performed by software and/or hardware of a computing device, such as that of system 100. In some embodiments, blocks 410 and onward may be performed by processing device(s) 204 executing machine learning code 212 at electronic device 200.

At block 410, data is received representing irregularly spaced actions or events, including past actions and a current action (target of the model).

At block 420, an action vector representation $a_n$ of the action category of an action is generated as input 112.

At block 430, a time vector representation $\tau_n$ of inter-arrival times between actions are generated as input 112.

At block 440, embedder 113 generates a concatenated vector representation $x_n^{emb}$ from the action vector representation $a_n$ and the time vector representation $\tau_n$.

At block 450A, the past actions are encoded into a vector representation, for example, prior LSTM 114A performs long short term memory on the concatenated vector representation $x_n^{emb}$ for past actions.

At block 450B, the current action is encoded into a vector representation, for example, posterior LSTM 114B performs long short term memory on concatenated vector representation $x_n^{emb}$ for the current action.

At block 460A, the output of prior LSTM 114A is passed to prior network 116A to compute a conditional prior distribution for a next action category.

At block 460B, the output of LSTM 114B is passed to posterior network 116B to compute a conditional next inter arrival time for the current action.

At block 470, a latent variable $z_n$ is sampled from the conditional prior distribution.

At block 480, action decoder 118A generates a probability distribution over action categories for the current action.

At block 490, time decoder 118B generates a probability distribution over inter-arrival times for the current action.

In some embodiments, the probability distribution over inter-arrival times for the current action is a temporal point process distribution.

In some embodiments, one or more parameters of the temporal point process distribution are determined using a neural network non-linear function.

In some embodiments, the temporal point process distribution follows an exponential distribution.

In some embodiments, the temporal point process distribution is a non-parametric formulation using normalizing flow.

It should be understood that the blocks may be performed in a different sequence of in an interleaved or iterative manner.

In some embodiments, software and/or hardware of a computing device may predict probabilities of action categories and probabilities of inter-arrival times of a next action, using a model trained using method 400.

In some embodiments, sequenced training data may be input into VAE model 110, and in some embodiments with normalizing flow as described herein, to receive a continuous probabilistic distribution for sequences. The continuous probabilistic distribution may be used to predict future events for marketing, financial planning, or other purposes. Examples of future events include life events such as when a person is likely to get married, change employment, purchase a home, and the like.

Figure 7:
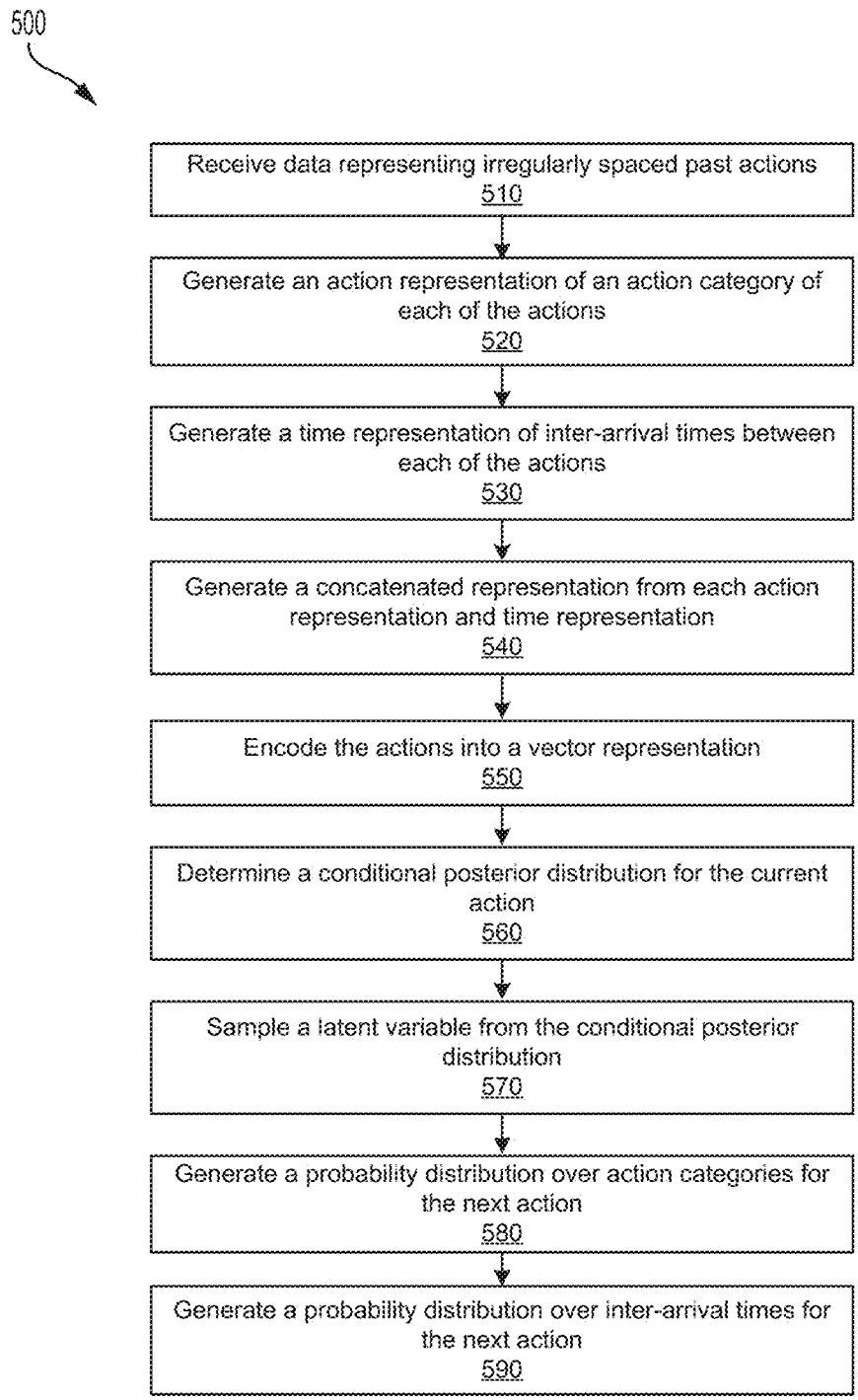
FIG. 7 is a flowchart of a method for generating probabilities of action categories and probabilities of inter-arrival times of next action from a sequence of past actions using a VAE model, according to an embodiment.

Further operation of machine learning code 212 is described with reference to the flowchart of FIG. 7. FIG. 7 is a flowchart of a method 500 for generating probabilities of action categories and probabilities of inter-arrival times of next action from a sequence of past actions using a VAE model such as VAE model 110, according to an embodiment implemented by system 100. Method 500, or one or more of blocks 510 to 590, may be performed for each time-step n of a sequence of n actions. The blocks are provided for illustrative purposes. Variations of the blocks, omission or substitution of various blocks, or additional blocks may be considered.

Method 500, in particular, one or more of blocks 510 to 590, may be performed by software and/or hardware of a computing device, such as that of system 100. In some embodiments, blocks 510 and onward may be performed by processing device(s) 204 executing machine learning code 212 at electronic device 200.

At block 510, data is received representing irregularly spaced past actions, including past actions.

At block 520, an action vector representation $a_n$ of the action category of a past action is generated as input 112.

At block 530, a time vector representation $\tau_n$ of inter-arrival times between past actions are generated as input 112.

At block 540, embedder 113 generates a concatenated vector representation $x_n^{emb}$ from the action vector representation $a_n$ and the time vector representation $\tau_n$.

At block 550, the past actions are encoded into a vector representation, for example, prior LSTM 114A performs long short term memory on the concatenated vector representation $x_n^{emb}$ for past actions.

At block 560, the output of prior LSTM 114A is passed to prior network 116A to compute a conditional prior distribution for a next action category.

At block 570, a latent variable $z_n$ is sampled from the conditional posterior distribution.

At block 580, action decoder 118A generates a probability distribution over action categories for the next action.

At block 590, time decoder 118B generates a probability distribution over inter-arrival times for the next action.

Conveniently, VAE model 110 may produce better distributions over future events and time predictions that competing methods.

VAE model 110 may provide a probabilistic model for sequences of events—for example, things or events that happen in someone's life, such as getting a job, getting married, having child, moving to new city, and retiring. VAE model 110 may model what event is likely to happen next for this person (as a categorical action). This may be combined with a probabilistic model for when that action or event is likely to happen.

VAE model 110 may develop a distribution over time which indicates that, given what we know now about person, they are likely to retire within a particular sort of probability distribution. This provides a probabilistic model for those types of data.

VAE model 110 may be able make predictions about, for example, consumer behaviour, market movements, world events in the future—what will happen, and when it will happen. VAE model 110 can also build latent representations—vectors that represent the current state of the world. Latent representations could be used for things such as matching. For example, this situation in a person's life is similar to another person's life at the same time.

As such, it may be useful to be able to predict life events and what people are likely to do in the future, such as being able to predict that a person is likely to retire in a particular time window, or likely to buy a house in a particular time period. This may apply to major life decisions, as well as more micro-level events, such as predicting who is likely to call into customer support line for help, or post negative things on social media about a company.

In an example use case, it may be possible to predict in a video that the next thing to happen is someone will open up the door or engage in a conversation with a friend.

The generative model disclosed herein is related to early stage action prediction. In a typical example, a video sequence may be used as input. It may be desirable to predict whether a person in a nursing home is going to fall, and want to predict if that will happen as soon as possible. By identifying in the video when someone starts to lose balance, it may be possible to predict that the person is going to fall.

By using the generative model disclosed herein it may be possible to predict something in the future, based on events that happened in past. There may be less of a causal link between actions, and it may be more difficult to discern what is happening. For example, it may be possible to predict a fall based on a person taking blood pressure medication and being tired, instead of directly viewing someone in the process of beginning to fall. Thus, the present model may not have any information about the action while predicting it. The generative model disclosed herein may be different from traditional early action prediction, because the generative model disclosed herein does not have any information about the action while predicting it.

VAE model 110 may use a sparse sequence of events in the absence of regularly spaced data referring as input to the model, and output sparse event data. Predictions may be made about irregularly timed spaced events. In traditional models, predictions may be made about lots of methods at every regularly-occurring time step (such as every minute or day) to make prediction. VAE model 110 may predict events that have a time when they might begin and time when they might end, in example where something may not be happening regularly, for example, every minute.

VAE model 110 may take as input things that are irregular as well. This is different from, for example, video sequencing with an input every thirtieth of a second, as another frame of the video. Instead, VAE model 110 may use irregular transactions or life events.

As such, VAE model 110 may be able to process irregularly spaced events. Embedder 113 is used to capture what has happened at a particular time moment. LSTM 114A, 114B are used to maintain data over time. Together, embedder 113 and LSTM 114A, 114B may be able to capture as a vector representation irregularly spaced set of events, namely, a vector representation of what the events were like.

In some embodiments, decoders, using a non-linear function (neural network), may allow for a representation to be mapped to a relatively standard distribution (such as time decoder 118B and the exponential distribution shown in Equation (18) herein), while in a highly non-linear fashion. Mapping to exponential distribution, but determining parameters of that distribution (i.e., $\lambda$) using a non-linear mapping may be very powerful.

In some embodiments, time decoder 118B may model a non-parametric distribution over action inter-arrival time, as in Equation (22).

Experiments were performed on two action prediction datasets: MultiTHUMOS Dataset [29] and Breakfast Dataset [14]. Standard training and testing sets were used. MultiTHUMOS Dataset is a challenging dataset for action prediction, containing 400 videos of 65 different actions. On average, there are 10.5 action class labels per video and 1.5 actions per frame. Breakfast Dataset contains 1712 videos of 48 action classes with a frame rate of 15 fps. The actions are performed by 52 people in 18 different kitchens.

VAE model 110 may be implemented with PyTorch [19] and may be trained with SGD during epochs with a particular batch size. For example, models may be trained using the Adam optimizer for 1,500 epochs with batch size 32 and learning rate 0.001. The standard training set of both datasets may be split into training and validation sets containing 70% and 30% of samples respectively. The best model, based on the model loss of Equation (22) on the validation set, may be selected.

VAE model 110 was compared with the following baseline models for action prediction tasks: a time-deterministic LSTM (TD-LSTM) and an action point process LSTM (APP-LSTM).

A Time Deterministic LSTM (TD-LSTM) was used that is a vanilla LSTM model that is trained to predict the next action category and the inter-arrival time, comparable with the model proposed by Farha et al [1]. This model directly predicts the inter-arrival time and not the distribution over it. TD-LSTM may us the same encoder network as VAE model 110. Cross-entropy loss for action category output is used and regression performed over inter-arrival time using mean squared error (MSE) loss similar to [1].

Action Point Process LSTM (APP-LSTM) baseline was used that predicts the inter-arrival time distribution similar to VAE model 110. The APP-LSTM model may use the same reconstruction loss function as in VAE model 110—cross entropy loss for action category and negative log-likelihood (NLL) loss for inter-arrival time. APP-LSTM does not have the stochastic latent code that allows VAE model 110 to model diverse distributions over action category and inter-arrival time. The APP-LSTM baseline encompasses Du et al. [6]'s work, differing in the way the intensity function (IF) is modeled. Du et al. [6] defines IS explicitly as a function of time. This design choice has been investigated in Zhong et al. [32]; an implicit intensity function is shown to be superior and thus adapted in the APP-LSTM baseline.

To compare models, such as VAE model 110 with APP-LSTM, the conditional log-likelihood (LL) may be used. The action category prediction accuracy and mean absolute error (MAE) of inter-arrival time may be reported.

Accuracy may be calculated by comparing the most probable action category from the model output with the ground truth category. MAE may be calculated using the expected inter-arrival time under the predicted distribution $p_\theta^\tau(\tau_n|z_n)$:

by selecting the category with the maximum probability. To infer the inter-arrival time of the next action given the history $\tau_1, \tau_2, \tau_3, \ldots \tau_i$, the expected time $\tau_{i+1}$ may be calculated with respect to the learned distribution $E(t_{i+1})$:

$$\mathbb{E}_{p_\theta^\tau(\tau_n|z_n)}[\tau_n] = \int_0^\infty \tau_n \cdot p_\theta^\tau(\tau_n|z_n) d\tau_n = \frac{1}{\lambda(z_n)} \quad (28)$$

Where $\frac{1}{\lambda(z_n)}$ is the expected value or prediction for the next inter-arrival time. The predicted inter-arrival time and the ground truth inter-arrival time may be use to compute MAE.

A model comparison on Breakfast and MultiTHUMOS datasets is illustrated in Table 1 of FIG. 8, comparing VAE model 110 with a Time Deterministic LSTM (TD-LSTM) and a vanilla LSTM encoder-decoder regression model without latent variables (APP-LSTM). Table 1 shows accuracy and MAE in predicting the future action given the history of previous actions. As shown, VAE model 110 outperforms TD-LSTM and APP-LSTM under both metrics of accuracy and MAE.

Further discussion and conclusion data is illustrated in Table 2, Table 3, Table 4 and Table 5 of FIG. 9.

Table 2 shows accuracy and MAE of VAE model 110 for different datasets, Breakfast and MultiTHUMOS.

Table 3 shows accuracy and MAE of VAE model 110 for different numbers of samples.

Table 4 shows log-likelihood of VAE model 110 as compared to APP-LSTM on Breakfast and MultiTHUMOS datasets. VAE model 110 outperforms the APP-LSTM on both MultiTHUMOS and Breakfast datasets. As such, VAE model 110 may be better at modeling the complex distribution over future actions.

Table 5 shows the log-likelihood of VAE model 110 for different sizes of the latent variable. As the size of the latent variable increases, it may be possible to model a more complex latent distribution which may result in better performance.

VAE model 110 with a learned prior variant may outperform a VAE model 110 with a fixed prior variant to the standard normal distribution $\mathcal{N}$ (0,I). A model with the fixed prior may not perform as well because it learns to predict the majority action class and average inter-arrival time of the training set, ignoring the history of any input test sequence.

Conveniently, a probabilistic model for point process data may be implemented as a variational auto-encoder, such as VAE model 110, that captures uncertainty in action times and category labels. As a generative model, a variational auto-encoder such as VAE model 110 can produce action sequences by sampling from a prior distribution, the parameters of which are updated based on neural networks that control the distributions over the next action type and its temporal occurrence.

A variation auto-encoder such as VAE model 110 can also be used to analyze given input sequences of actions to determine the likelihood of observing particular sequences. As described herein, it has been demonstrated empirically that the model may be effective for capturing the uncertainty inherent in tasks such as action prediction and anomaly detection.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

REFERENCES

[1] Y. Abu Farha, A. Richard, and J. Gall. When Will You Do What?-Anticipating Temporal Occurrences of Activities. In IEEE Conference on Computer Vision and Pattern Recognition (CVPR), 2018.

[2] J. Bütepage, H. Kjellstr̈om, and D. Kragic. Classify, predict, detect, anticipate and synthesize: Hierarchical recurrent latent variable models for human activity modeling. arXiv preprint arXiv:1809.08875, 2018.

[3] D. Damen, H. Doughty, G. M. Farinella, S. Fidler, A. Furnari, E. Kazakos, D. Moltisanti, J. Munro, T. Perrett, W. Price, and M. Wray. Scaling Egocentric Vision: The EPICKITCHENS Dataset. In European Conference on Computer Vision (ECCV), 2018.

[4] R. De Geest, E. Gavves, A. Ghodrati, Z. Li, C. Snoek, and T. Tuytelaars. Online action detection. In B. Leibe, J. Matas, N. Sebe, and M. Welling, editors, Computer Vision—ECCV 2016, pages 269-284, Cham, 2016. Springer International Publishing.

[5] E. Denton and R. Fergus. Stochastic video generation with a learned prior. In J. Dy and A. Krause, editors, Proceedings of the 35th International Conference on Machine Learning, volume 80 of Proceedings of Machine Learning Research, pages 1174-1183, Stockholmsmssan, Stockholm Sweden, 10-15 Jul. 2018. PMLR.

[6] N. Du, H. Dai, R. Trivedi, U. Upadhyay, M. Gomez-Rodriguez, and L. Song. Recurrent marked temporal point processes: Embedding event history to vector. In Proceedings of the 22Nd ACM SIGKDD International Conference on Knowledge Discovery and Data Mining, KDD '16, pages 1555-1564, New York, N.Y., USA, 2016. ACM.

[7] B. G. Fabian Caba Heilbron, Victor Escorcia and J. C. Niebles. ActivityNet: A Large-Scale Video Benchmark for Human Activity Understanding. In IEEE Conference on Computer Vision and Pattern Recognition (CVPR), 2015.

[8] J. Gao, Z. Yang, and R. Nevatia. RED: reinforced encoder-decoder networks for action anticipation. CoRR, abs/1707.04818, 2017.

[9] J. He, A. Lehrmann, J. Marino, G. Mori, and L. Sigal. Probabilistic video generation using holistic attribute control. In The European Conference on Computer Vision (ECCV), September 2018.

[10] M. Hoai and F. D. la Torre. Max-margin early event detectors. In 2012 IEEE Conference on Computer Vision and Pattern Recognition, pages 2863-2870, June 2012.

[11] S. Hochreiter and J. Schmidhuber. Long short-term memory. Neural Comput., 1997.

[12] H. Idrees, A. R. Zamir, Y. Jiang, A. Gorban, I. Laptev, R. Sukthankar, and M. Shah. The THUMOS challenge on action recognition for videos "in the wild". CoRR, 2016.

[13] D. P. Kingma and M. Welling. Auto-Encoding Variational Bayes. In International Conference on Learning Representations (ICLR), 2014.

[14] H. Kuehne, A. Arslan, and T. Serre. The Language of Actions: Recovering the Syntax and Semantics of Goal-Directed Human Activities. In IEEE Conference on Computer Vision and Pattern Recognition (CVPR), 2014.

[15] T. Lan, T.-C. Chen, and S. Savarese. A hierarchical representation for future action prediction. In D. Fleet, T. Pajdla, B. Schiele, and T. Tuytelaars, editors, Computer Vision—ECCV 2014, pages 689-704, Cham, 2014. Springer International Publishing.

[16] S. Ma, L. Sigal, and S. Sclaroff. Learning activity progression in lstms for activity detection and early detection. In 2016 IEEE Conference on Computer Vision and Pattern Recognition (CVPR), pages 1942-1950, June 2016.

[17] T. Mahmud, M. Hasan, and A. K. Roy-Chowdhury. Joint prediction of activity labels and starting times in untrimmed videos. In The IEEE International Conference on Computer Vision (ICCV), October 2017.

[18] S. Oh, A. Hoogs, A. Perera, N. Cuntoor, C. Chen, J. T. Lee, S. Mukherjee, J. K. Aggarwal, H. Lee, L. Davis, E. Swears, X. Wang, Q. Ji, K. Reddy, M. Shah, C. Vondrick, H. Pirsiavash, D. Ramanan, J. Yuen, A. Torralba, B. Song, A. Fong, A. Roy-Chowdhury, and M. Desai. A large-scale benchmark dataset for event recognition in surveillance video. In CVPR 2011, pages 3153-3160, June 2011.

[19] A. Paszke, S. Gross, S. Chintala, G. Chanan, E. Yang, Z. DeVito, Z. Lin, A. Desmaison, L. Antiga, and A. Lerer. Automatic differentiation in pytorch. In Advances in Neural Information Processing Systems (NIPS), 2017.

[20] V. Pătrăucean, A. Handa, and R. Cipolla. Spatio-temporal video autoencoder with differentiable memory. In International Conference on Learning Representations (ICLR) Workshop, 2016.

[21] A. Patron, M. Marszalek, A. Zisserman, and I. Reid. High Five: Recognising human interactions in TV shows. In British Machine Vision Conference (BMVC), 2010.

[22] M. Rohrbach, S. Amin, M. Andriluka, and B. Schiele. A database for fine grained activity detection of cook-

[23] M. Sadegh Aliakbarian, F. Sadat Saleh, M. Salzmann, B. Fernando, L. Petersson, and L. Andersson. Encouraging LSTMs to Anticipate Actions Very Early. In IEEE International Conference on Computer Vision (ICCV), 2017.

[24] Y. Shi, B. Fernando, and R. Hartley. Action anticipation with rbf kernelized feature mapping rnn. In The European Conference on Computer Vision (ECCV), September 2018.

[25] S. Stein and S. J. McKenna. Combining Embedded Accelerometers with Computer Vision for Recognizing Food Preparation Activities. In Proceedings of the 2013 ACM International Joint Conference on Pervasive and Ubiquitous Computing, 2013.

[26] R. Villegas, J. Yang, Y. Zou, S. Sohn, X. Lin, and H. Lee. Learning to Generate Longterm Future via Hierarchical Prediction. In International Conference on Machine Learning (ICML), 2017.

[27] C. Vondrick and A. Torralba. Generating the future with adversarial transformers. In The IEEE Conference on Computer Vision and Pattern Recognition (CVPR), July 2017.

[28] S. Xiao, M. Farajtabar, X. Ye, J. Yan, L. Song, and H. Zha. Wasserstein learning of deep generative point process models. In Advances in Neural Information Processing Systems (NIPS), 2017.

[29] S. Yeung, O. Russakovsky, N. Jin, M. Andriluka, G. Mori, and L. Fei-Fei. Every Moment Counts: Dense Detailed Labeling of Actions in Complex Videos. International Journal of Computer Vision (IJCV), 2017.

[30] R. Yu, Z. Shi, and L. Qing. Unsupervised learning aids prediction: Using future representation learning variantial autoencoder for human action prediction. CoRR, abs/1711.09265, 2017.

[31] Y. Zhong, B. Xu, G.-T. Zhou, L. Bornn, and G. Mori. Time Perception Machine: Temporal Point Processes for the When, Where and What of Activity Prediction. ArXiv e-prints, August 2018.

What is claimed is:

1. A computer-implemented method for training a variational auto-encoder model for asynchronous future action prediction, comprising:

receiving data representing events, the events being discrete events occurring in continuous time, the events including past events and a current event, the events including irregularly time spaced events that do not occur at regular time intervals, wherein the model does not have any information about the current event, wherein the current event does not have a discernable causal relationship with the past events;

for each of the events, generating an event representation, the event representation based on an event category selected from a plurality of event categories;

generating a time representation of inter-arrival times between each of the events;

generating a concatenated representation of each event representation and associated time representation;

encoding the concatenated representations of the past events into a past vector representation;

encoding the concatenated representations of the current event into a current vector representation;

determining a conditional prior distribution for a next event, based at least in part on the past vector representation;

determining a conditional posterior distribution for the current event, based at least in part on the current vector representation;

sampling a latent variable from the conditional prior distribution;

generating a probability distribution over the plurality of event categories for a current event category using an action decoder neural network;

generating a probability distribution over inter-arrival times for the current event category using a time decoder neural network, wherein the probability distribution over inter-arrival times is parametrized by the time decoder neural network, wherein the time decoder neural network accepts the sampled latent variable as input, wherein the time decoder neural network includes at least one time decoder neural network activation layer and at least one time decoder neural network layer that applies an exponential non-linear mapping to an output of the at least one time decoder neural network activation layer to generate a positive parameter for the probability distribution over inter-arrival times;

updating a parameter of the conditional prior distribution using the action decoder neural network and the time decoder neural network such that the parameter of the conditional prior distribution shifts over training to improve accuracy of labelling a predicted next event with a label representing an event category of the plurality of event categories;

generating one or more labels for a predicted next event in a sequence of events or for performing a next event based on the generated probability distributions over the current event category and the inter-arrival times, wherein the one or more labels for the predicted next event is based on a most probable event category from the probability distribution over the plurality of event categories for a current event category, wherein the predicted next event has a predicted inter-arrival time based on the probability distribution over inter-arrival times and the positive parameter for the probability distribution over inter-arrival times; and communicating via a user interface the one or more labels for the predicted next event.

2. The computer-implemented method of claim 1, further comprising:

optimizing a variational lower bound comprising a difference between a log likelihood of ground truth data and a Kullback-Leibler divergence between the true and conditional posterior distributions.

3. The computer-implemented method of claim 1, further comprising modelling the probability distribution over inter-arrival times for the current event category with a non-parametric temporal point process distribution using a normalizing flow framework.

4. The computer-implemented method of claim 1, wherein the conditional prior distribution is time-variant and a function of all past events except the current event.

5. The computer-implemented method of claim 1, wherein the conditional prior distribution or the conditional posterior distribution is a Gaussian distribution.

6. The computer-implemented method of claim 1, wherein the conditional prior distribution and the conditional posterior distribution are modelled as a multivariate Gaussian distributions with diagonal covariance.

7. The computer-implemented method of claim 1, further comprising modelling the probability distribution over the current event category with a multinomial distribution.

8. The computer-implemented method of claim 1, further comprising modelling the probability distribution over inter-arrival times for the current event category with a parameterized exponential distribution.

9. The computer-implemented method of claim 3, wherein the temporal point process distribution follows an exponential distribution.

10. The computer-implemented method of claim 1, wherein the encoding the concatenated representations of the past events into a past vector representation is with a long short-term memory network.

11. The computer-implemented method of claim 1, wherein the encoding the concatenated representations of the current event into a current vector representation is with a long short-term memory network.

12. The computer-implemented method of claim 1, wherein the events are irregularly spaced in time.

13. A non-transitory computer readable medium comprising a computer readable memory storing computer executable instructions thereon that when executed by a computer cause the computer to:
predict probabilities of event categories and probabilities of inter-arrival times of a next event, using a model trained using the method of claim 1.

14. A computer-implemented method for generating probabilities of event categories and probabilities of inter-arrival times of a next event from a sequence of past events using a variational auto-encoder model for asynchronous future action prediction, comprising:
receiving data representing the past events, the past events and the next event being discrete events occurring in continuous time, the events including irregularly time spaced events that do not occur at regular time intervals, wherein the model does not have any information about the next event, wherein the next event does not have a discernable causal relationship with the past events;
generating an event representation, the event representation based on an event category selected from a plurality of event categories for each of the past events;
generating a time representation of inter-arrival times between each of the past events;
generating a concatenated representation of each event representation and associated time representation;
encoding the concatenated representations into a vector representation;
determining a conditional posterior distribution for the next event;
sampling a latent variable from the conditional posterior distribution;
generating a probability distribution over the plurality of events categories for a next event category using an action decoder neural network;
generating a probability distribution over inter-arrival times for the next event category using a time decoder neural network, wherein the probability distribution over inter-arrival times is parametrized by the time decoder neural network, wherein the time decoder neural network accepts the sampled latent variable as input, wherein the time decoder neural network includes at least one time decoder neural network activation layer and at least one time decoder neural network layer that applies an exponential non-linear mapping to an output of the at least one time decoder neural network activation layer to generate a positive parameter for the probability distribution over inter-arrival times; updating a parameter of the conditional prior distribution using the action decoder neural network and the time decoder neural network such that the parameter of the conditional prior distribution shifts over training to improve accuracy of labelling a predicted next event with a label representing an event category of the plurality of event categories;
generating one or more labels for a predicted next event in a sequence of events or for performing a next event based on the generated probability distributions over the current event category and the inter-arrival times, wherein the one or more labels for the predicted next event is based on a most probable event category from the probability distribution over the plurality of event categories for a current event category, wherein the predicted next event has a predicted inter-arrival time based on the probability distribution over inter-arrival times and the positive parameter for the probability distribution over inter-arrival times; and
communicating via a user interface the one or more labels for the predicted next event.

15. The computer-implemented method of claim 14, wherein the encoding the concatenated representations into a current vector representation is with a long short-term memory network.

16. The computer-implemented method of claim 14, further comprising modelling the probability distribution over the next event category with a multinomial distribution.

17. The computer-implemented method of claim 14, further comprising modelling the probability distribution over inter-arrival times for the next event category with a parameterized exponential distribution.

18. The computer-implemented method of claim 14, further comprising modelling the probability distribution over inter-arrival times for the next event category with a nonparametric temporal point process distribution using a normalizing flow framework.

19. The computer-implemented method of claim 14, wherein the past events are irregularly spaced in time.

20. The computer-implemented method of claim 1 wherein the data representing the events is video data.

21. The computer-implemented method of claim 1 wherein the generated one or more outputs comprises a latent representation in the form of a vector representing a current state of events, wherein the latent representation can be used for matching.

* * * * *